United States Patent
Holcomb et al.

(10) Patent No.: US 7,673,829 B2
(45) Date of Patent: Mar. 9, 2010

(54) HAND-HELD FOOD PROCESSOR AND BLADE ASSEMBLY

(75) Inventors: David A. Holcomb, Seattle, WA (US); Adam A. Jossem, Seattle, WA (US)

(73) Assignee: Chef'n Corporation, Seattle, WA (US)

( * ) Notice: Subject to any disclaimer, the term of this patent is extended or adjusted under 35 U.S.C. 154(b) by 237 days.

(21) Appl. No.: 11/759,142

(22) Filed: Jun. 6, 2007

(65) Prior Publication Data
US 2008/0301952 A1   Dec. 11, 2008

(51) Int. Cl.
B02C 18/16   (2006.01)
(52) U.S. Cl. ................ 241/292.1; 241/282.2
(58) Field of Classification Search .............. 241/292.1, 241/282.1, 282.2
See application file for complete search history.

(56) References Cited

U.S. PATENT DOCUMENTS

| | | |
|---|---|---|
| 507,903 A | 10/1893 | Hancock |
| 1,194,318 A | 8/1916 | Power |
| 1,511,287 A | 10/1924 | Lindley |
| 1,619,550 A | 3/1927 | Thebaud et al. |
| 2,246,054 A | 6/1941 | Marty |
| 2,347,383 A | 4/1944 | Wiegratz |
| 2,407,819 A | 9/1946 | Dolan, II |
| 2,592,481 A | 4/1952 | Spencer et al. |
| 2,796,987 A | 6/1957 | Meyer |
| 3,123,114 A | 3/1964 | Andrews et al. |
| 3,156,278 A | 11/1964 | Otto |
| 3,581,790 A | 6/1971 | Del Conte |
| 3,990,358 A | 11/1976 | Cade |
| 4,007,751 A | 2/1977 | Commiant |
| 4,124,310 A | 11/1978 | Brackman et al. |
| 4,442,764 A | 4/1984 | Bos et al. |
| 4,682,740 A | 7/1987 | Conigliaro et al. |
| 4,768,429 A | 9/1988 | Federighi |
| 4,905,465 A | 3/1990 | Jones et al. |
| D315,657 S | 3/1991 | Ruttimann |
| 5,245,726 A | 9/1993 | Rote et al. |
| 5,360,170 A | 11/1994 | Cartellone |
| 5,401,159 A | 3/1995 | Hsu |
| 5,435,237 A | 7/1995 | Huang |
| 5,617,783 A | 4/1997 | Beeler |

(Continued)

FOREIGN PATENT DOCUMENTS

FR   1012262   7/1952

(Continued)

*Primary Examiner*—Mark Rosenbaum
(74) *Attorney, Agent, or Firm*—Seed IP Law Group PLLC (57) ABSTRACT

A blade assembly for use with a food processor includes a hub configured to be coupled to a drive shaft of the food processor, a first blade rotatably coupled to the hub and configured to rotate with respect to the hub at least up to a predetermined angle with respect to a second blade, which is fixedly coupled to the hub. The first blade is rotatable between a first position in which it is in phase with the second blade for receiving a blade guard protecting both blades, and a second position, in which the first blade is out of phase with the second blade for optimally processing a food item in the food processor, the blade assembly also including a biasing member for returning the first blade to the first position after use.

11 Claims, 9 Drawing Sheets

U.S. PATENT DOCUMENTS

| | | |
|---|---|---|
| 5,735,193 A | 4/1998 | Chang |
| 5,782,416 A | 7/1998 | Nejatbina |
| D396,992 S | 8/1998 | Lallemand |
| 5,823,672 A | 10/1998 | Barker |
| 5,960,709 A | 10/1999 | Yip |
| 5,996,483 A | 12/1999 | Yip |
| 6,000,650 A | 12/1999 | Penaranda et al. |
| 6,035,771 A | 3/2000 | Conran et al. |
| 7,264,189 B2 | 9/2007 | Holcomb et al. |
| 2002/0153440 A1 | 10/2002 | Holcomb et al. |

FOREIGN PATENT DOCUMENTS

| | | |
|---|---|---|
| FR | 2603221 A1 | 3/1988 |
| FR | 2713069 | 6/1995 |
| JP | 57-026670 | 2/1982 |
| JP | 62-100989 | 5/1987 |
| JP | 02-046276 | 2/1990 |
| JP | 3022041 | 3/1996 |
| JP | 10-174647 | 6/1998 |
| WO | 2007/128153 A1 | 11/2007 |

HAND-HELD FOOD PROCESSOR AND BLADE ASSEMBLY

BACKGROUND

1. Technical Field

The present disclosure is generally related to food processing devices, and more particularly, to a blade assembly for a hand-held food-processing device.

2. Description of the Related Art

Hand-held, hand-powered food processors are known and all basically rotate a spindle to which is connected some form of cutting, beating, or mixing arms. Some of these processors use a hand crank for the drive to rotate the spindle. The Yip patent 5,996,483 is an example. These types of drives for the spindle are often expensive, lack torque, or do not give a long enough pulse of rotation to the spindle for effective action on the food to be processed.

The Yip patent, mentioned above, shows a garlic peeling and peanut shelling processor that uses a rigid beater to throw garlic at a series of vertical ribs spaced along the circumference of a retaining cylinder to break the skin of the garlic.

Application Ser. Nos. 09/839,027 and 11/361,061 provide hand-held food processors with improved drive mechanisms; however, these devices typically comprise a blade arrangement that is suboptimal with respect to gaining maximum momentum before confronting a food item. Furthermore, the blade is typically exposed after use.

Accordingly, there is a need for a hand-held food processor and a blade assembly that maximizes blade momentum for more effective processing of food items, and permits automatic rearrangement of blades into a configuration in which the blades can be covered without a user having to touch the blades.

BRIEF SUMMARY

According to one embodiment, a blade assembly for use with a food processor, comprises a hub configured to be coupled to a drive shaft of the food processor, a first blade rotatably coupled to the hub and configured to rotate between a first position and a second position, a second blade fixedly coupled to the hub, and a biasing member configured to bias the first blade toward the first position such that, when the hub ceases to rotate after use the first bladed returns to the first position and the first and second blades are in phase.

According to one aspect, the biasing member includes a coil spring having a first end and a second end, the coil spring being fixedly coupled to the hub toward the first end and being fixedly coupled to the first blade toward the second end.

According to another embodiment, a food processing device comprises a blade assembly having a hub to coupled to a drive shaft of the food processor, a first blade rotatably coupled to the hub and configured to rotate with respect to the hub between a first position and a second position, a second blade fixedly coupled to the hub, and a biasing member configured to automatically bias the first blade toward the first position, the first and second blades being in phase when the first blade is in the first position.

DETAILED DESCRIPTION

Figure 1:
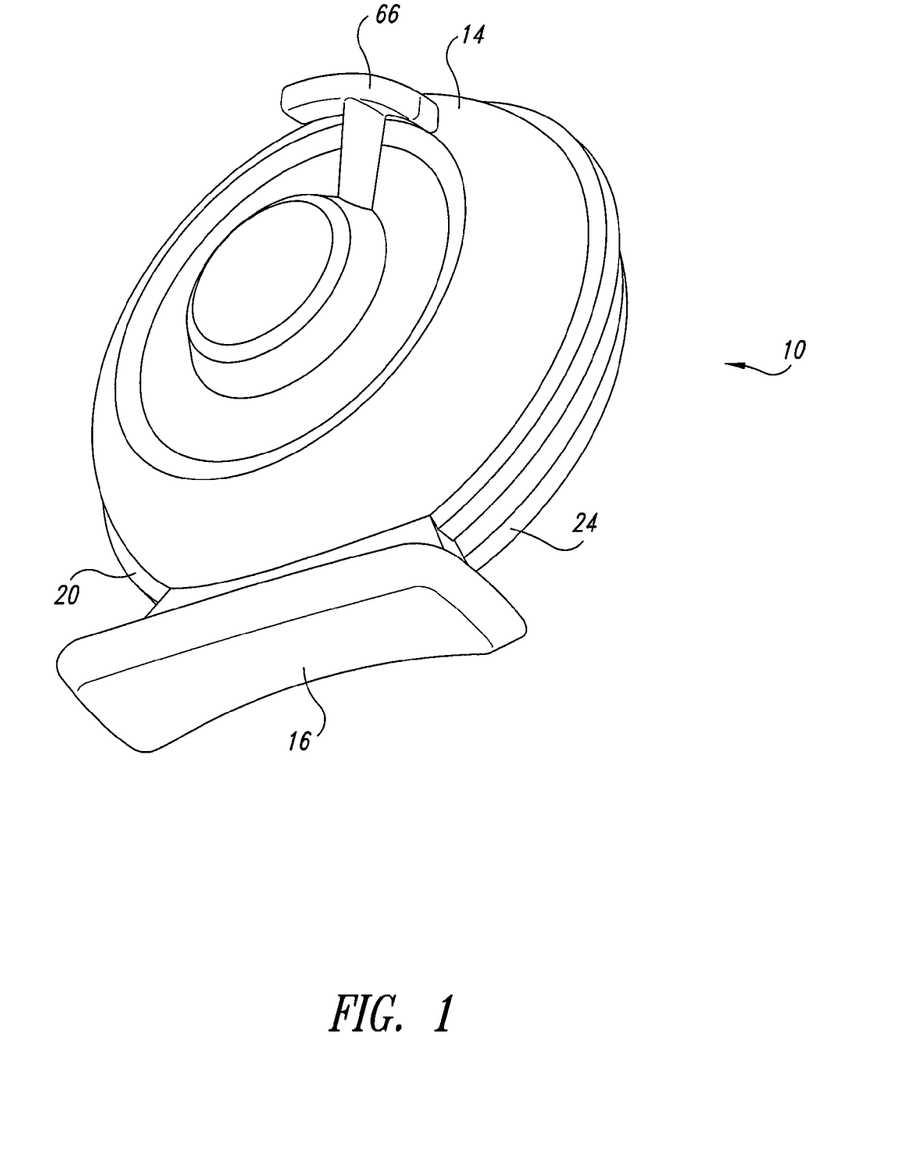
FIG. 1 illustrates an isometric view of a hand-held hand-powered food processor according to one embodiment.

FIG. 1 illustrates one embodiment of a hand-held hand-powered food processor 10, which includes an axial end cup or food holder 12 (FIG. 2) fitted in an axial end housing 14. While the description of the details of some embodiments will be described with reference to a hand-held, hand-powered food processor, it should be understood that a peeler version of the invention may also be used advantageously as a separate device for use in larger electrically powered table top food processors.

Figure 2:
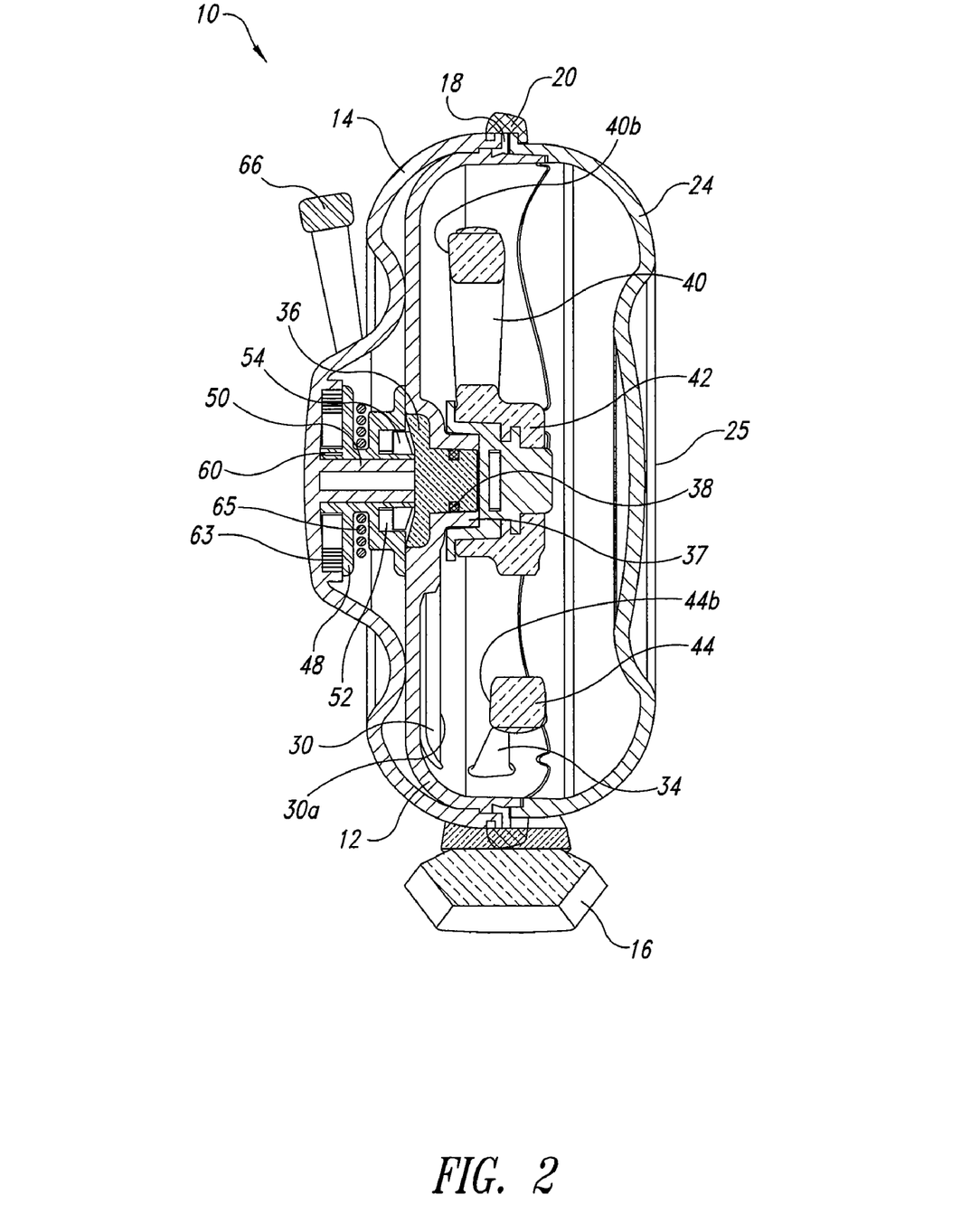
FIG. 2 is an axial cross section of the hand-held hand-powered food processor of FIG. 1.

A palm grip or table support member 16 is attached to the end housing 14. The support member 16 can be made of a resilient material such as rubber, and can either be held in a palm of a user when the food processor 10 is being held only in the hands or can be rested on a table or counter when the food processor 10 is used in the upright position as shown in FIG. 2. The end housing 14 is formed with a gasket 18 (FIG. 2) and a locking collar 20. The food holder 12, gasket 18 and locking collar 20 can be all bonded together. The locking collar 20 has locking slots 22 that mesh with locking ribs 23 (FIG. 3) on a cover 24. The cover 24 is thus attached and sealed by inserting the locking ribs 23 into the locking slots 24 and giving a relative twist between the cover 24 and the end housing 14.

Figure 3:
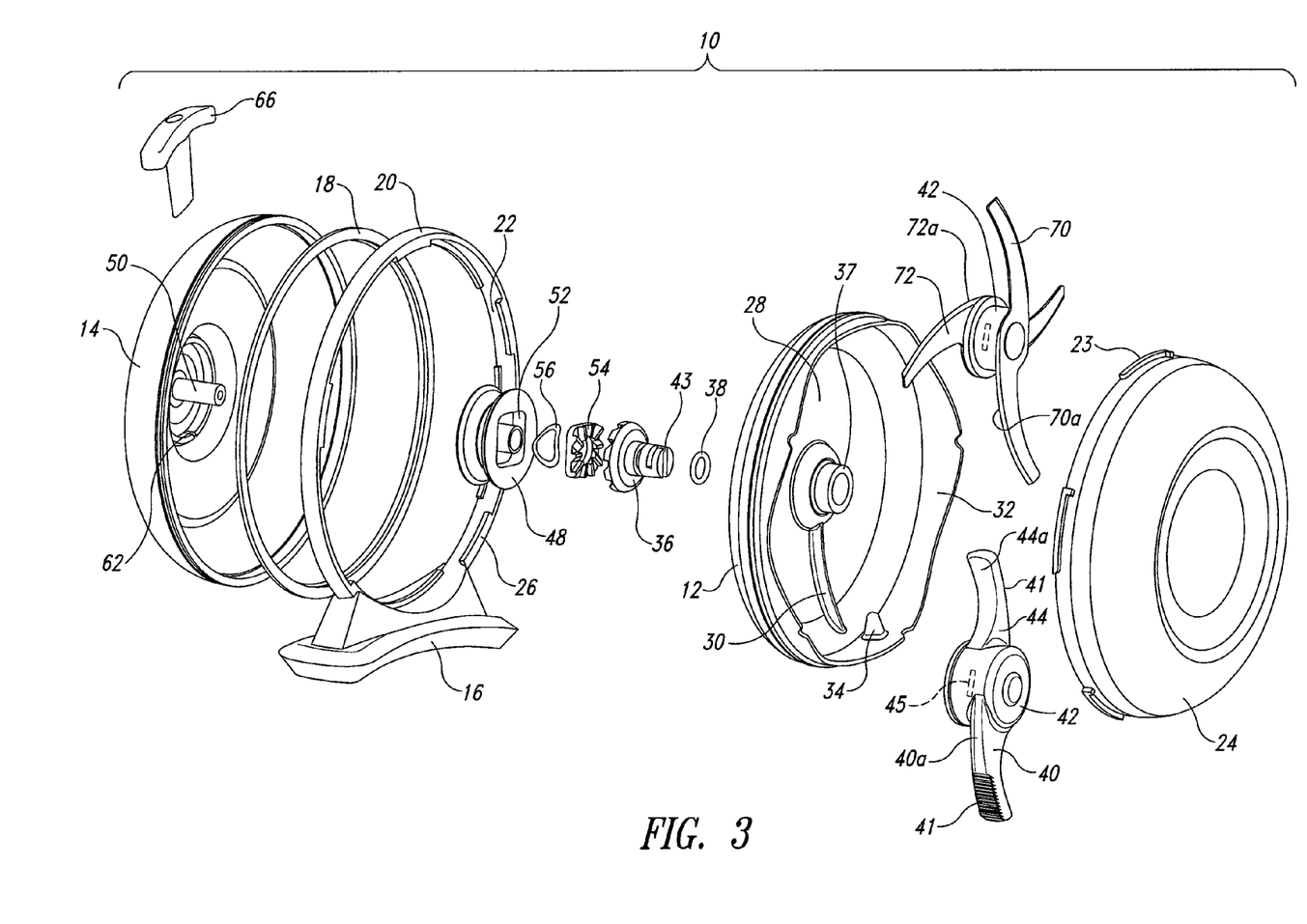
FIG. 3 is an exploded view of the hand-held hand-powered food processor of FIG. 1.

As illustrated in FIG. 3, the food holder 12 includes an end surface 28 and a sidewall 32. A long rib 30 is formed on the end surface 28 and a small stop block 34 is attached to the sidewall 32. The food processor 10 further includes one or more arms 40, 44, 70, 72 for a desired processing of the food, such as peeling, chopping, slicing, cutting, blending, mincing or any other suitable processing of the food. In one embodiment, the rib 30 and/or stop block 34 can be positioned proximate a vertical centerline of the food holder 12. This allows food in the food processor 10 to accumulate by gravity over the stop block 34 and adjacent the long rib 30 to enhance contact between the arm 40 (described below) and the food in the food holder 12. The food is thus subjected to improved shearing action between the arms 70, 72 when the arm is a chopper (as described below) or improved peeling action when the arms 40, 44 is a peeling arm (also described below). One position for use of the food processor 10 is thus as shown in FIG. 2 but the food processor 10 can also be held in other positions.

Furthermore, the food processor 10 includes a drive shaft 36 extending through a collar 37 fixed to the end surface 28 of the food holder 12 and sealed with an o-ring 38. The drive shaft 36 can include a radial right angle notch 43 for removably connecting to a key 45 of a hub 42 that secures the arms 40, 44, 70, 72, respectively.

As illustrated in FIG. 2, the cover 24 includes a uniform outer periphery 25, which serves as a base to support the cover 24 on a table or counter top when the cover 24 is removed from the food processor 10. In this manner chopped foods, peeled garlic, or blended liquid dressings can be deposited into the cover 24 by removing the cover 24 from an underside or bottom position on the food processor 10. Thus the contents of the food processor 10 will fall into the cover 24, which can then be removed and placed on the table or counter top for holding the contents of the food processor 10.

As illustrated in FIG. 3, in one embodiment, in which the food processor 10 is configured for peeling, the first arm 40 is attached to the a hub 42 and the second arm 44 is axially spaced from the first arm 40, the second arm 44 also attaching to the hub 40. The first arm 40 that lies closer to a widest portion or central portion of the food holder 12 and cover 24, can be slightly longer than the second arm 42. The first and second arms 40, 44 respectively include first and second ends 40a and 44a that are spaced closely from the stop block 34. The first and second arms 40, 44 can be generally convex on their forward surface in plan view, each comprising a forward facing roughened surface 41 in the direction of rotation of the first and second arms 40, 44.

The roughed surface 41 can include transverse grooves; however, other roughed or textured surfaces can also be used. The first and second arms 40, 44 may comprise a resilient or partially flexible material, such as an elastomeric material, which itself can be of a sticky type. The purpose of the forward facing surfaces is to engage the skin of the food to be peeled, such as garlic cloves, and rub against a skin of the food to dislodge, for example, a garlic meat from a garlic clove. The stop block 34 serves to stop the food, for example, garlic, from freely moving or spinning in the food holder 12. The long rib 30 also tends to hold the food or garlic and allow the first and/or second arms 40, 44 to rub against the garlic so held by the rib 30.

In one embodiment, at least one arm (for example, the first arm 40) can be rotatably mounted to the hub 42, such that it rotates a predetermined angle α with respect to the other arm (for example, the second arm 44) before encountering a structure on the hub to prevent its further relative rotation. In this manner, as the user activates the drive 36 only one of the arms, for example, the second arm 44, which is fixedly or rigidly attached to the hub 42 will pose resistance against the drive 36 and against rotation of the hub 42 upon confronting the food. By the time the first arm 40 reaches a position in which it is fixed with respect to the hub 42, the hub 42 has gained sufficient momentum and velocity for optimally cutting or peeling the food. In contrast, when both the first and second arms are fixed on the hub, they may simultaneously encounter the food before sufficiently accelerating and not optimally cut or peel the food.

Figure 4:
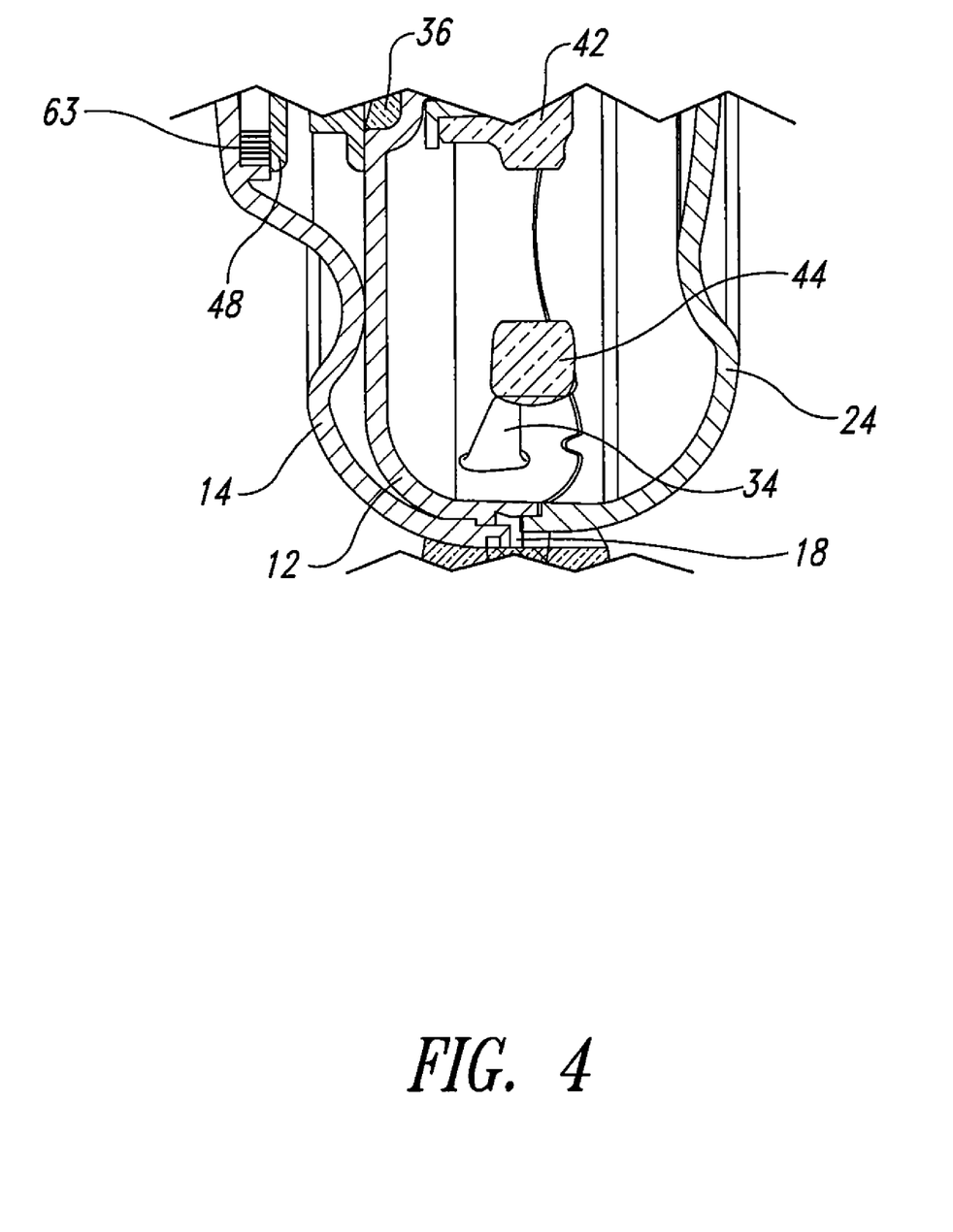
FIG. 4 is a partial fragmentary section of a hand-held hand-powered food processor according to another embodiment.

The action of the first and second arms 40, 44 or only one arm, such as arm 44, can also successfully peel garlic while the use of two arms may provide an improved and more effective peeling action. The long rib 30 is also not essential, as shown in FIG. 4, but the use of this rib 30 may expedite the peeling process. When the rib 30 is used, a gap between an end 30a of the rib 30 and confronting surfaces 40b or 44b of the first and second arms 40, 44 are preferably between 0.050 and 0.150 inches, respectively. In some embodiments, the stop block 34 can be eliminated if the first and second arms 40, 44 are used in an electrically powered food processor. When the power is manual, the shorter period for peeling is more important than if the drive for rotating the drive shaft 36 is electrically driven and can operate for a longer period of time. The elastomeric first and second arms 40, 44 can be made of a flexible elastomeric material having a durometer of between Shore A 60 and Shore A 100 and preferably a durometer of between Shore A 80 and Shore A 82.

In one embodiment as illustrated in FIGS. 2 and 3, propulsion for the drive shaft 36 is provided via a unique manually powered pull cord motor having a pulley 48 rotatably mounted on a post 50. The pulley 48 has a square recess 52 in which a toothed ratchet wheel 54 is fitted. The ratchet wheel 54 is biased outwardly (to the right in FIG. 3) by a disc spring 56. A plurality of teeth formed on the ratchet wheel 54 mesh in a driving direction with mating teeth formed on the drive shaft 36. However, the complement teeth of the ratched wheel 54 and drive shaft 26 are configured to allow the teeth of the ratchet wheel 54 to slide past the teeth of the drive shaft 36 upon reverse rotation of the pulley 48. The pulley 48 has a slot 60, the end housing 14 has a slot 62, and a coiled strip spring 63 has its ends fitted in the slots 60, 62, providing for a return rotation to the pulley 48.

Figure 5:
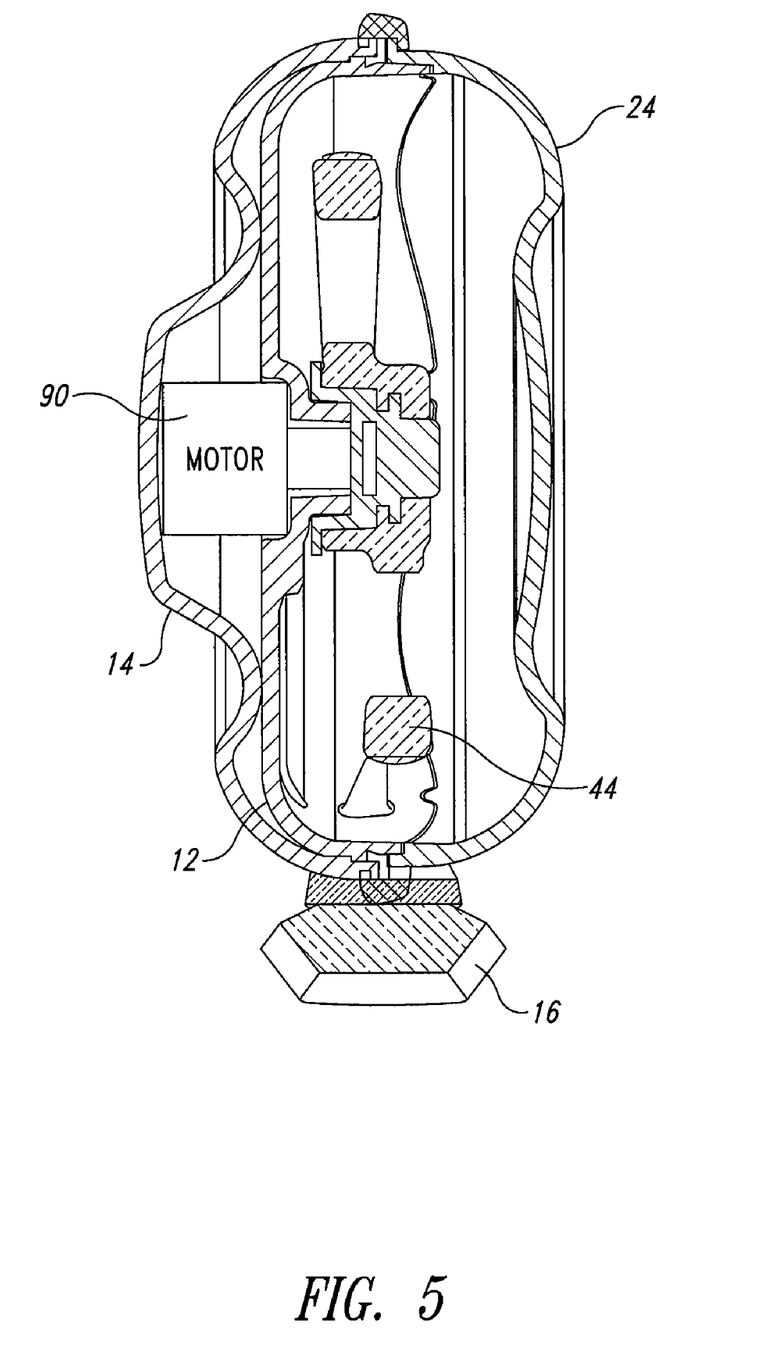
FIG. 5 is a cross-sectional view of a hand-held hand-powered food processor according to yet another embodiment.

Thus, the unidirectional rotational motion of the drive shaft 36 can be accomplished in the hand-powered version of the food processor 10 by a pull cord 65 having several wraps around the pulley 48. The pull cord 65 includes a handle 66. The advantage of this pull cord type of rotational drive or motor is that the elastomeric arms 40, 44 are run at a high torque and at a high velocity (e.g., over 500 rpm) for several revolutions (e.g., about 5 or 6) from each pull of the handle 66. These rotations are for a relatively long rotational period. The first and second arms 40, 44 have little mass and thus may stop prematurely when engaging the food in the food processor 10 unless the pull cord type of motor applies the high torque and long duration of rotation. Of course, an electrically powered drive motor, as shown in FIG. 5, can have a high torque and a long period of rotational power so the duration of rotation, high torque, and velocity needed in a hand-powered motor is less important for an electrically powered motor.

While embodiments have been described with regard to a peeler, the food processor can also be used as a chopper. However, it should be understood that the peeler version has utility and purpose either alternatively with the chopper or as an independent peeler. When the food processor 10 is used as the chopper, it utilizes first and second arms 70, 72 having sharpened forward facing cutting first and second blades 70a, 72a, respectively. The first and second arms 70, 72 are also attached to a hub 42 that can also be drivingly and removably engaged with the drive shaft 36, in a manner similar to that described above with respect to the first and second peeling arms 40, 44. When used as a chopper, the rib 30 has an additional function of deflecting the cut or chopped food so that it is repeatedly tossed into a path of the rotating first and second blades 70a, 72a. This function helps expedite the cutting process and causes the food to be cut into smaller pieces. A combination of the stop block 34 and the long rib 30 creates a shearing action with the first and second blades 70a, 70b to increase a chopping speed and creates more uniform smaller chopped pieces.

The chopper can also be used as a mixer and has been found to rapidly mix oils and vinegars or other salad dressing ingredients in small quantities. The chopper has been found to emulsify the oil and vinegar to better blend the dressing.

In the one form of the chopper or peeler, the processor can include both chopper blades and with peeler arms so that they can be used interchangeably. Thus, a user can peel garlic, then after removing the skins from the food holder, add other foods and further chop the peeled garlic, and chop the other added foods. A dressing can then be blended for a small salad ready to serve.

FIG. 5 shows the food processor but with a battery powered, unidirectional electric motor 90 substituted for the pull cord motor and one way drive.

Figure 6:
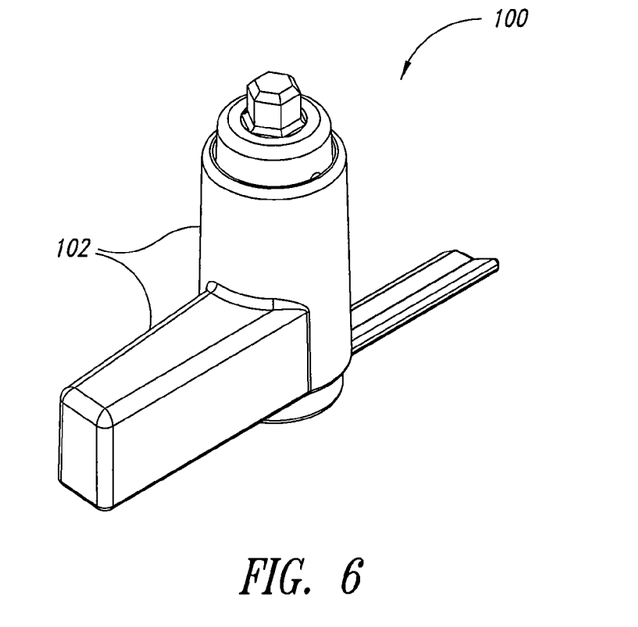
FIG. 6 is an isometric view of a blade assembly and its cover for a food processor according to another embodiment.
Figure 7:
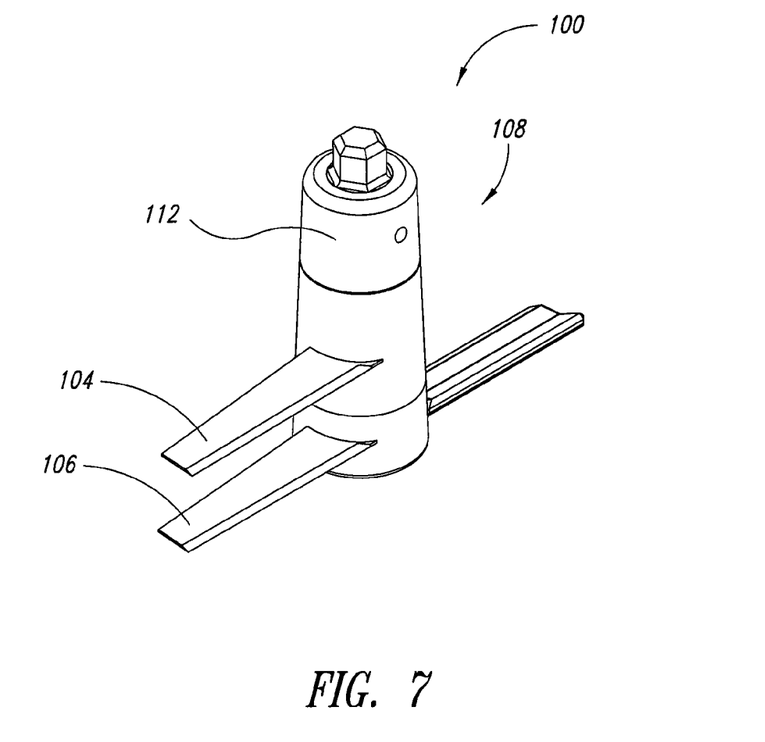
FIG. 7 is an isometric view of the blade assembly of FIG. 6 in a first state.

FIG. 6 illustrates yet another embodiment, in which a blade assembly 100 is provided for a food processor. The illustrated blade assembly 100 includes a blade guard 102 that is configured to fit over and cover first and second blades 104, 106 (FIG. 7). In FIG. 7, the blade assembly 100 is illustrated with the blade guard 102 removed and the first and second blades 104, 106 in a first state. In the first state, the first and the second blades 104, 106 are substantially parallel and the first blade 104 is positioned such that it is in phase with the second blade 106. For example, in one embodiment, the first blade 104 is positioned directly above the second blade 106 when in the first state. As discussed above in conjunction with other embodiments, to minimize resistance against initial rotation of a hub 108, the first blade 104 is rotatably mounted to a hub 108. Upon activation of the blade assembly 100, the first blade 104 can be configured to rotate with respect to the hub 108 over a predefined angle α (FIG. 8), such as an angle having a magnitude of about 180 degrees, and cease rotation with respect to the hub 108 after rotating by the angle α.

Figure 8:
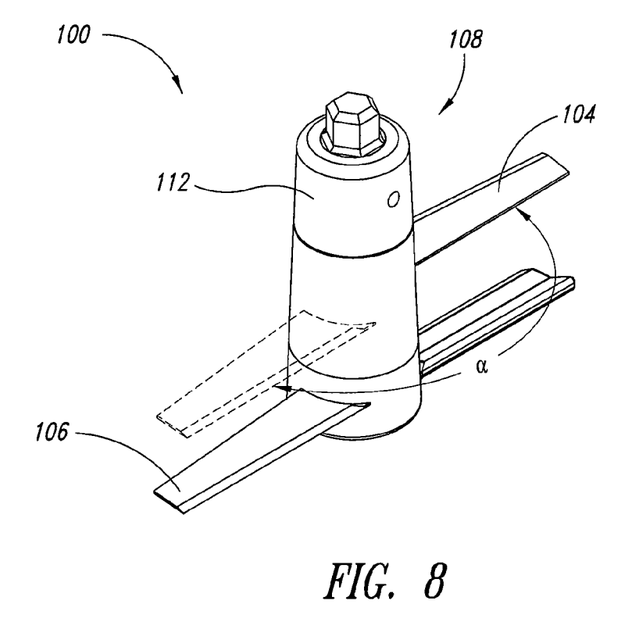
FIG. 8 is an isometric view of the blade assembly of FIG. 6 in a second state.

Accordingly, the blades 104, 106 begin by being in phase to maximize acceleration of the blades 104, 106, and rotate to a second state as shown in FIG. 8, in which the blades are positioned at the angle α with respect to each other, for example 180 degrees, for effective blending, cutting, mincing or chopping. After use, the blades 104, 106 return to the first state to allow a user to place the blade guard 102 over the blades 104, 106 after use.

Figure 9:
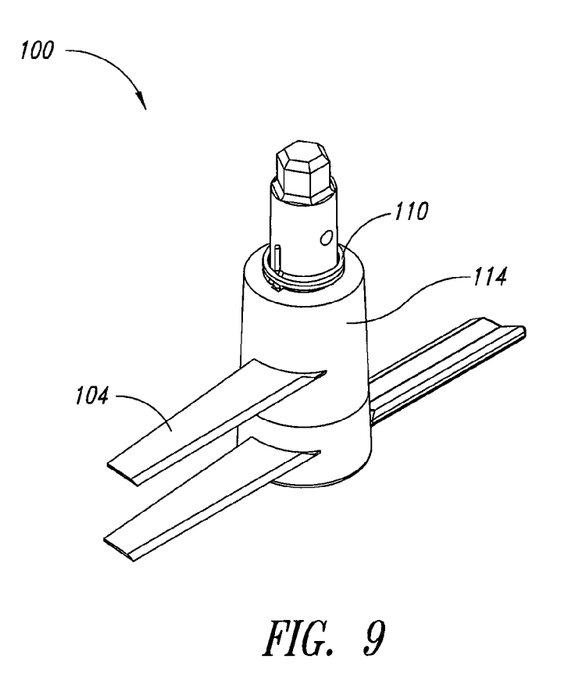
FIG. 9 is an isometric view of an exposed portion of the blade assembly of FIG. 6.

In one embodiment as shown in FIG. 9, the blade assembly 100 includes a biasing member 110 that is fixedly coupled to the first blade 104 and a first portion 112 (FIGS. 7 and 8) of the hub 108. The biasing member 110 is configured to build potential energy as the first blade 104 rotates with respect to the hub 108 and the second blade 106. The biasing member 110 is also configured such that when the blades 104, 106 are activated manually or via an electrical motor, a rotational momentum of the first blade 104 overcomes a tendency of the biasing member 110 to maintain the first blade 104 in phase with the second blade 106.

Furthermore, the biasing member 110 forces the first blade 104 back to being in phase with the second blade 106 when rotation of the hub 108 ceases such that the blades 104, 106 automatically return to the first state and are ready to receive the blade guard 102. Accordingly, the user need not touch the blades 104, 106 by hand for rearranging the blades 104, 106. The biasing member 110 also ensures that the blades 104, 106 begin by being in phase in the first state before a subsequent use, for achieving optimum blade acceleration as discussed above.

In one embodiment, the first blade 104 can be rigidly attached to a first base 114, which is rotatably mounted to a mounting shaft 116 (FIG. 10) of the lower hub 108b. In the illustrated embodiment, the biasing member 110 can be fixedly coupled to the first base 114 toward an end of the biasing member 110.

The biasing member 110 can include any suitable structure that substantially lacks a potential for biasing when the first blade 104 is in the first position, and builds the potential for biasing as the first blade 104 rotates toward the second position. For example, the biasing member 110 may include a coil spring having a first end and a second end, the coil spring being fixedly coupled to the first portion 112 of the upper hub 108a toward the first end and being fixedly coupled to the first base 114 of the first blade 104 toward the second end.

Figure 10:
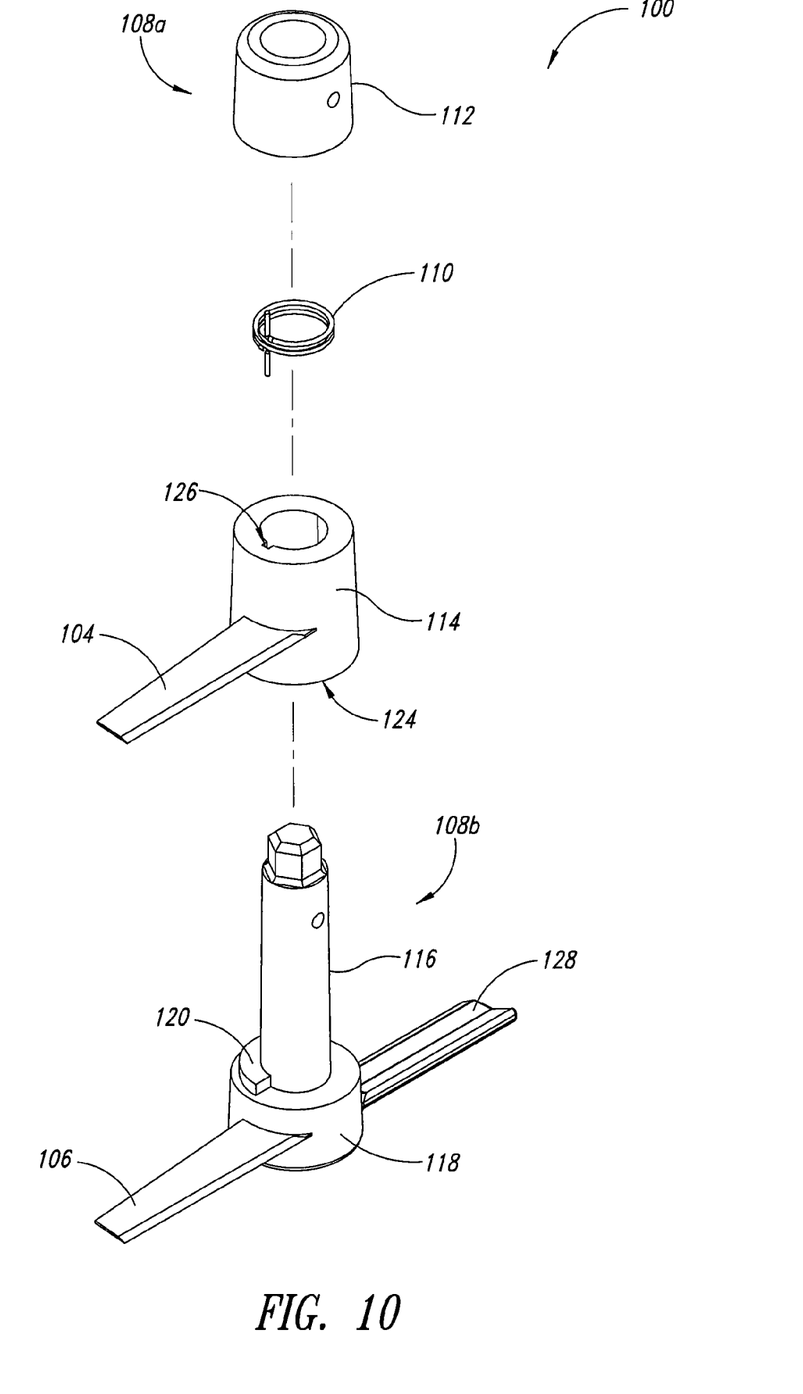
FIG. 10 is an exploded isometric view of the blade assembly of FIG. 6.

FIG. 10 illustrates an exploded view for purposes of describing one example construction of the blade assembly 100. However, one of ordinary skill in the art will appreciate that other configurations are possible that do not depart from the scope of the claims that follow. The hub 108 can comprise the first portion 112, the mounting shaft 116, and a second portion 118, the shaft 116 being positioned or extending between the first and second portions 112, 118. The second blade 106 is fixedly attached to a first surface of the second portion 118 and the mounting shaft 116 is fixedly attached to a second surface of the second portion 118, such that the mounting shaft 116 extends in a different direction than the second blade 106, for example in a direction that is perpendicular to the second blade 106.

Figure 11:
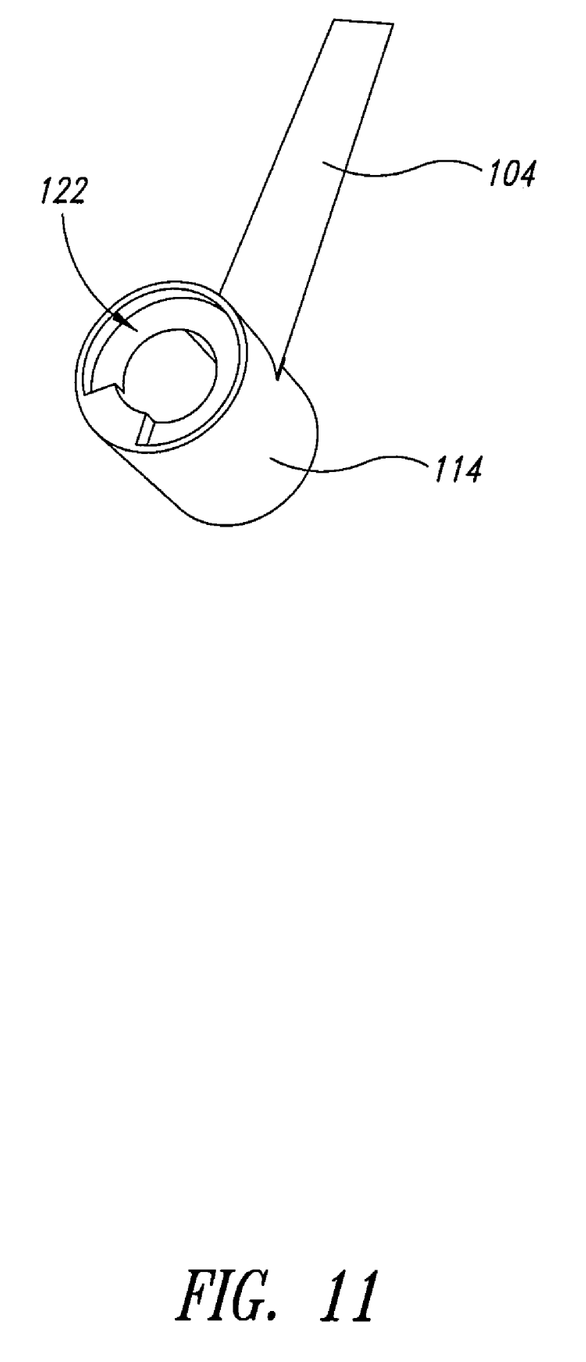
FIG. 11 is a bottom isometric view of a portion of the blade assembly of FIG. 6.

Furthermore, the first blade 104 is rigidly attached to the first base 114, which in turn is rotatably coupled to the mounting shaft 116. A first structure 120 is formed on the second portion 118 of the lower hub 108b that interacts with a complementary second structure 122 (FIG. 11) formed toward a surface 124 of the first base 114 of the first blade 104. The first and second structures 120, 122 are configured to allow the first base 114 to rotate with respect to the second portion 118 of the lower hub 108b up to the angle α (FIG. 8). For example, the first structure 120 can be a boss or protrusion extending adjacent a first portion of a periphery of the mounting shaft 116 and the second structure 122 can be a recess extending adjacent a second portion of the periphery of the mounting shaft 116 and configured to slidably engage the boss or protrusion to limit the rotation of the first blade when an end of the recess encounters an end of the protrusion.

The first base 114 further comprises a first key 126 for engaging a portion of the biasing member 110. The first portion 112 of the hub 108 also includes a similar key for engaging another portion of the biasing member 110 for winding the biasing member 110 as the first blade 104 and the base 114 thereof rotate with respect to the second blade 106 and about the mounting shaft 116. All components of the blade assembly 100 can be removably assembled with respect to each other so that the user can disassemble the blade assembly 100 for cleaning and/or replacing some of the components thereof, as required.

In one embodiment, the blade assembly 100 may comprise an arm 128 fixedly coupled to and extending away from the mounting shaft 116, which can act to counterbalance a weight of the first and second blades 104, 106 upon initiating rotation of the hub. The arm 128 also adds to the rotational momentum of the blade assembly 100 for expediting the acceleration thereof. Furthermore, the arm 128 can also act as a barrier or beating device for confronting and striking the food item or items in the food processor toward a path of the first and second blades 104, 106, for being processed, for example for being cut, chopped, minced, shredded, or blended.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet, are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A blade assembly for use with a food processor, comprising:
   a hub configured to be coupled to a drive shaft of the food processor;
   a first blade rotatably coupled to the hub and configured to rotate between a first position and a second position;
   a second blade fixedly coupled to the hub; and
   a biasing member configured to bias the first blade toward the first position such that, when the hub ceases to rotate after use the first blade returns to the first position and the first and second blades are in phase.

2. The blade assembly of claim 1, further comprising:
   an obstructing structure between the first blade and the hub configured to limit rotation of the first blade with respect to the hub to a first angle of rotation.

3. The blade assembly of claim 2 wherein the hub comprises a mounting shaft positioned between a first portion and a second portion of the hub and the first blade is fixedly attached to a first base, the first base being rotatably coupled to the mounting shaft and having a first end positioned adjacent the second portion of the hub, the obstructing structure comprising a protrusion formed on the second portion of the hub and a recess formed toward the first end of the first base, the recess being configured to slidably engage the protrusion to limit the rotation of the first blade when an end of the recess encounters an end of the protrusion.

4. The blade assembly of claim 3 wherein the protrusion and recess are sized to allow the first blade to rotate up to an angle having a magnitude of approximately 180 degrees.

5. The blade assembly of claim 3 wherein the first portion of the hub comprises a first key and the first base comprises a second key, the first key fixedly receiving a first portion of the biasing member and the second key fixedly receiving a second portion of the biasing member.

6. The blade assembly of claim 1 wherein the biasing member substantially lacks a potential for biasing when the first blade is in the first position, and the potential for biasing increases as the first blade rotates toward the second position.

7. The blade assembly of claim 1 wherein the biasing member includes a coil spring having a first end and a second end, the coil spring being fixedly coupled to the hub toward the first end and being fixedly coupled to the first blade toward the second end.

8. The blade assembly of claim 1, further comprising:
   a blade guard configured to cover the first and second blades when the first blade is in the first state, for protecting the blades prior to and after use.

9. A food processing device comprising:
   a blade assembly having a hub coupled to a drive shaft of the food processor, a first blade rotatably coupled to the hub and configured to rotate with respect to the hub between a first position and a second position, a second blade fixedly coupled to the hub, and a biasing member configured to automatically bias the first blade toward the first position, the first and second blades being in phase when the first blade is in the first position.

10. The food processing device of claim 9, wherein the biasing member includes a coil spring having a first end and a second end, a first portion of the hub having a first key, the first blade being coupled to a first base, the first base having a second key, the first key fixedly receiving the first end of the coil spring and the second key fixedly receiving the second end of the coil spring.

11. The food processing device of claim 9, further comprising:
   an obstructing structure between the first blade and the hub configured to limit rotation of the first blade with respect to the hub to a first angle of rotation, wherein the hub comprises a mounting shaft extending between a first portion and a second portion of the hub and the first blade is fixedly attached to an annular first base, the first base being rotatably coupled to the mounting shaft and having a first end positioned adjacent the second portion of the hub, the obstructing structure comprising a protrusion formed on the second portion of the hub and a recess formed toward the first end of the first base, the recess being configured to slidably engage the protrusion to limit the rotation of the first blade when an end of the recess encounters an end of the protrusion.

* * * * *